United States Patent [19]
Yoshioka

[11] 3,971,571
[45] July 27, 1976

[54] FRONT WHEEL SUSPENSION UNIT FOR MOTORCYCLES

[75] Inventor: Koji Yoshioka, Higashi-Osaka, Japan

[73] Assignees: Kayabakogyokabushikikaisha; Koji Yoshioka, both of Tokyo, Japan

[22] Filed: Apr. 30, 1975

[21] Appl. No.: 573,241

Related U.S. Application Data

[63] Continuation-in-part of Ser. No. 499,886, March 11, 1974, abandoned, which is a continuation of Ser. No. 113,558, Feb. 8, 1971, abandoned.

[52] U.S. Cl. ........................... 280/276; 280/80 R; 280/277
[51] Int. Cl.² ...................................... B62K 25/06
[58] Field of Search ........... 280/276, 277, 275, 285, 280/286, 80 R, 283, 284; 180/32

[56] References Cited
UNITED STATES PATENTS

| | | | |
|---|---|---|---|
| 456,604 | 7/1891 | Thompson | 280/277 |
| 2,428,148 | 9/1947 | Dawson | 280/276 |
| 3,084,950 | 4/1963 | Rass | 280/80 R |

FOREIGN PATENTS OR APPLICATIONS

| | | | |
|---|---|---|---|
| 25,763 | 4/1906 | Austria | 280/286 |
| 535,690 | 11/1955 | Italy | 280/277 |
| 11,399 | 1894 | United Kingdom | 280/277 |

*Primary Examiner*—Kenneth H. Betts
*Attorney, Agent, or Firm*—Saul Jecies

[57] ABSTRACT

A front wheel suspension unit for motorcycles, in which the center part of a crank-shaped bent shaft having two parallel axes is taken as the axle, so that buffer effects may be produced against impact inputs in the horizontal direction of movement as well as in the vertical direction, and the wheel is supported, rotating freely around the axis of the said axle, while the other shaft part of the said bent shaft is held at the lower part of the front fork, so that the wheel may be supported while turning freely around the axis of the said shaft part.

5 Claims, 13 Drawing Figures

FRONT WHEEL SUSPENSION UNIT FOR MOTORCYCLES

CROSS-REFERENCE TO RELATED APPLICATION

The present application is a continuation-in-part of my copending application Ser. No. 499,886 filed Mar. 11, 1974, now abandoned, which in turn is a continuation of my application, Ser. No. 113,558 filed Feb. 8, 1971, now abandoned.

BACKGROUND OF THE INVENTION

In relation to front wheel suspension units of motorcycles, the present invention refers particularly to an improvement of the front wheel suspension unit utilizing an eccentric supporter for the purpose of producing excellent buffer effects against impact inputs not only in the vertical direction but also in the horizontal direction of movement.

In conventional motorcycle front-wheel suspension units, front forks consisting of a suspension spring and a hydraulic damper are commonly employed for connecting the cycle body to the wheel, so that the body can move up and down elastically. Even though conventional suspension means of this type may absorb impact force to produce satisfactory buffer effects in the vertical direction when they work with the wheel, they have little effect against an impact force working in the horizontal direction of movement. Namely, they have a defect in that their buffer effects are not very satisfactory in this respect.

In view of above, the inventor previously presented a novel front wheel suspension unit in Ser. No. 499,886 dated Mar. 11, 1974, of the type where an eccentric supporter was utilized so as to resolve the defect mentioned above. Namely, in the said invention, an eccentric cylindrical type supporter is employed, where the hub of the wheel is fitted, rotating freely on roller bearings, to the outer circumference of an eccentric supporter and a bearing shaft is inserted so that rotation occurs in the horizontal direction, passing through the eccentric position, and roller bearings are incorporated in the same range; both ends of the bearing shaft are supported at the lower part of the front fork so that the wheel may revolve around the axle and also describe a circular motion around the bearing shaft. According to the invention, therefore, the wheel revolves around the eccentric supporter and the cycle body is driven smoothly. In such a case, an impact force working on the wheel in the vertical direction may be absorbed and lessened by the extension and contraction of the front fork, and since the wheel is caused to describe a circular motion around the bearing shaft, the wheel may move back and forth, reacting immediately to an impact force in the horizontal direction of movement as well, thus making it possible to produce buffer effects as the horizontal force is converted to a vertical impact force.

Nevertheless, a suspension unit utilizing such an eccentric cylindrical type supporter is not very satisfactory. For one thing, the roller bearings incorporated between the outer circumference of the eccentric supporter and the inner circumference of the wheel hub become large in diameter to an extent such that the circumferential speed becomes very high during high-speed driving, producing revolution noises and shortening the bearing life. Furthermore, since the rated load of roller bearings is specified according to the inner diameter, such large roller bearings fitted to the outer circumference of the eccentric supporter must have a larger rated load than actually required, and this represents another defect in that the unit does not have advantages with regard to weight and cost of the bearings.

SUMMARY OF THE INVENTION

The purpose of the present invention is, therefore, to offer an improved suspension unit of the kind that may resolve the defects mentioned above without degrading any of the other advantageous characteristis of a motorcycle front-wheel suspension unit utilizing an eccentric supporter.

To achieve this, in the present invention, the axle is inserted through the center of the wheel hub using ball bearings, so that the wheel may be supported while rotating freely around the axis of the axle. Link members hanging in parallel to each other are fixed to both ends of the said axle which extends outwards from the hub of the wheel, and bearing shafts extending outwards parallel to the said axle from the lower part of these link members are supported, turning freely, at the lower part of the front fork.

Thus, the wheel revolves smoothly around the axle and describes a circular motion around the bearing shafts. Furthermore, the crank-like eccentric supporter consisting of an axle, link members fixed to both its ends, and bearing shafts extending from these link members, makes it possible to minimize the diameter of ball bearings which are incorporated between the axle and the wheel and between the bearing shafts and the lower part of the front fork. A suspension unit utilizing an eccentric supporter according to the present invention, therefore, makes it possible to resolve the defects mentioned above which are inherent in conventional units without degrading the other advantageous characteristics.

Not only the above stated purposes, characteristics and performances of the present invention, but others also, may be realized by the invention detailed in the following descriptions, which are made with reference to the attached drawings.

DESCRIPTION OF THE PREFERRED EMBODIMENT

Figure 1:
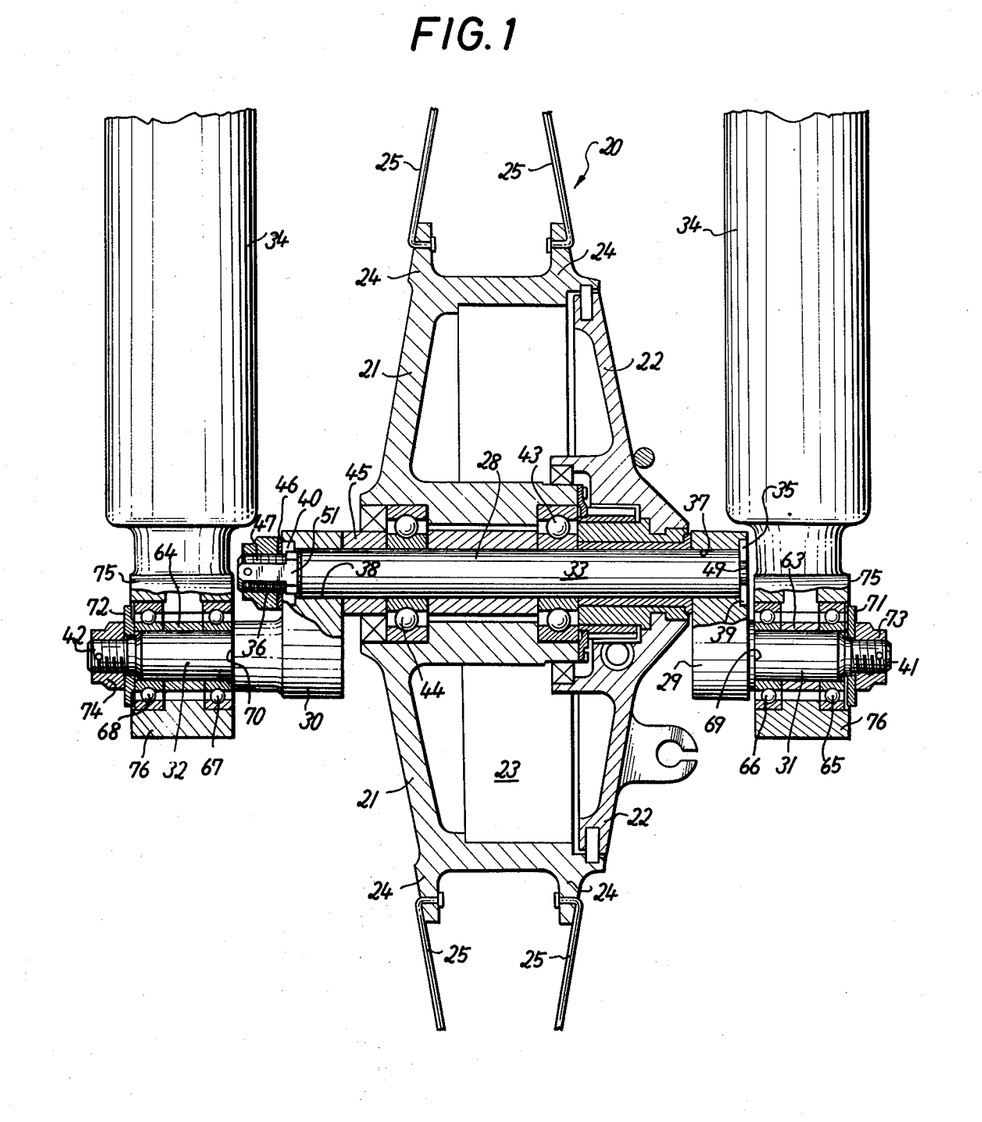
FIG. 1 is a front longitudinal sectional view showing an application example in which a motorcycle front wheel suspension unit made according to the present invention is adapted for use on a drum brake type front wheel.
Figure 2:
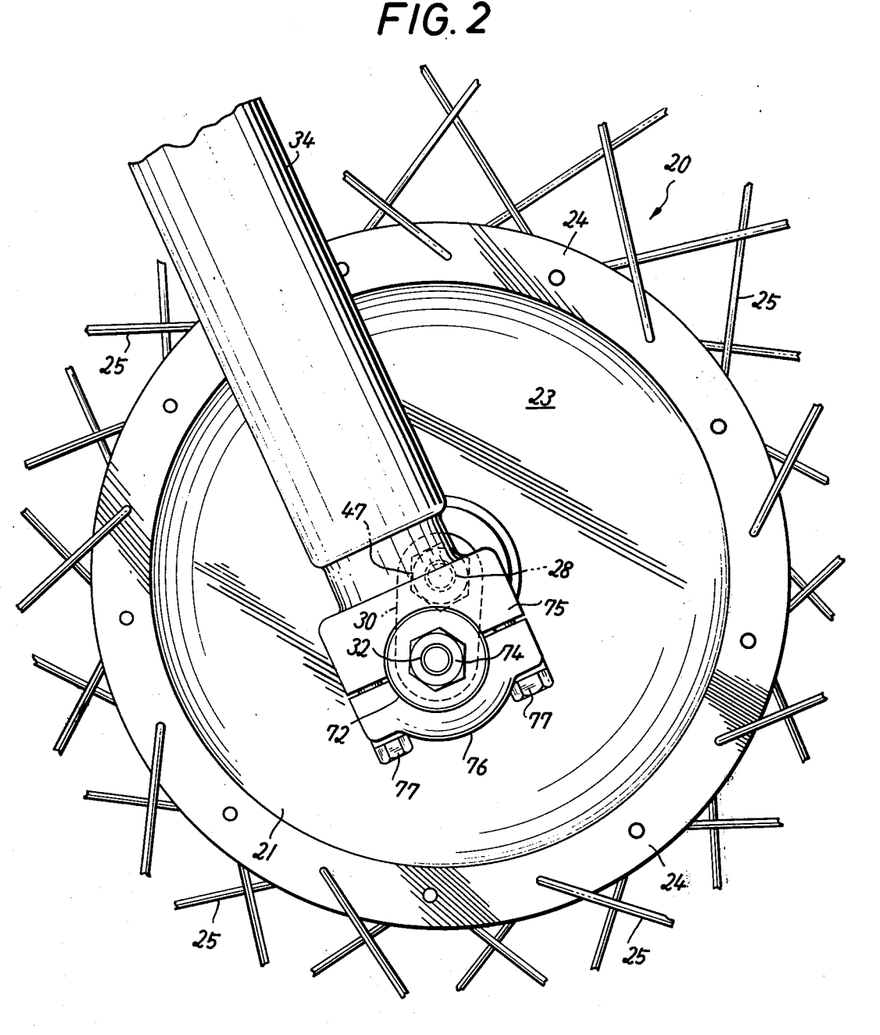
FIG. 2 is a side view of the same.
Figure 3:
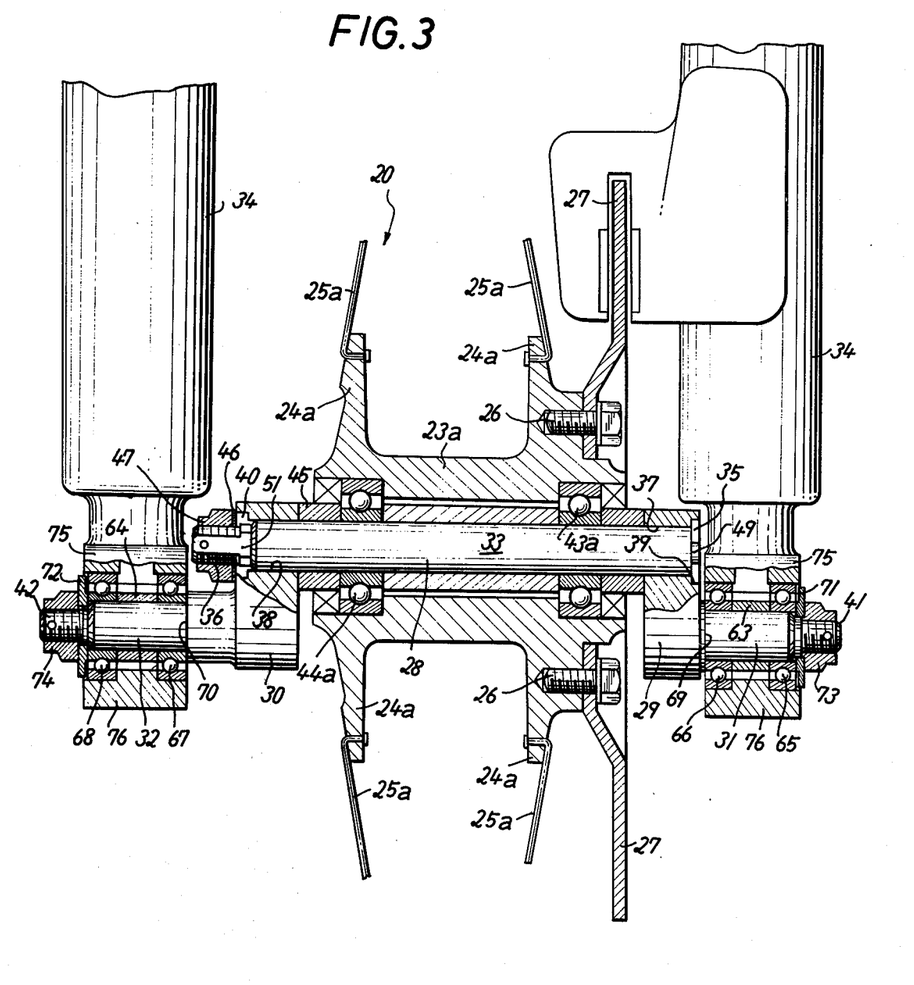
FIG. 3 is a front longitudinal sectional view showing an application example where a unit of the present invention is adapted for use on a disk brake type front wheel.
Figure 4:
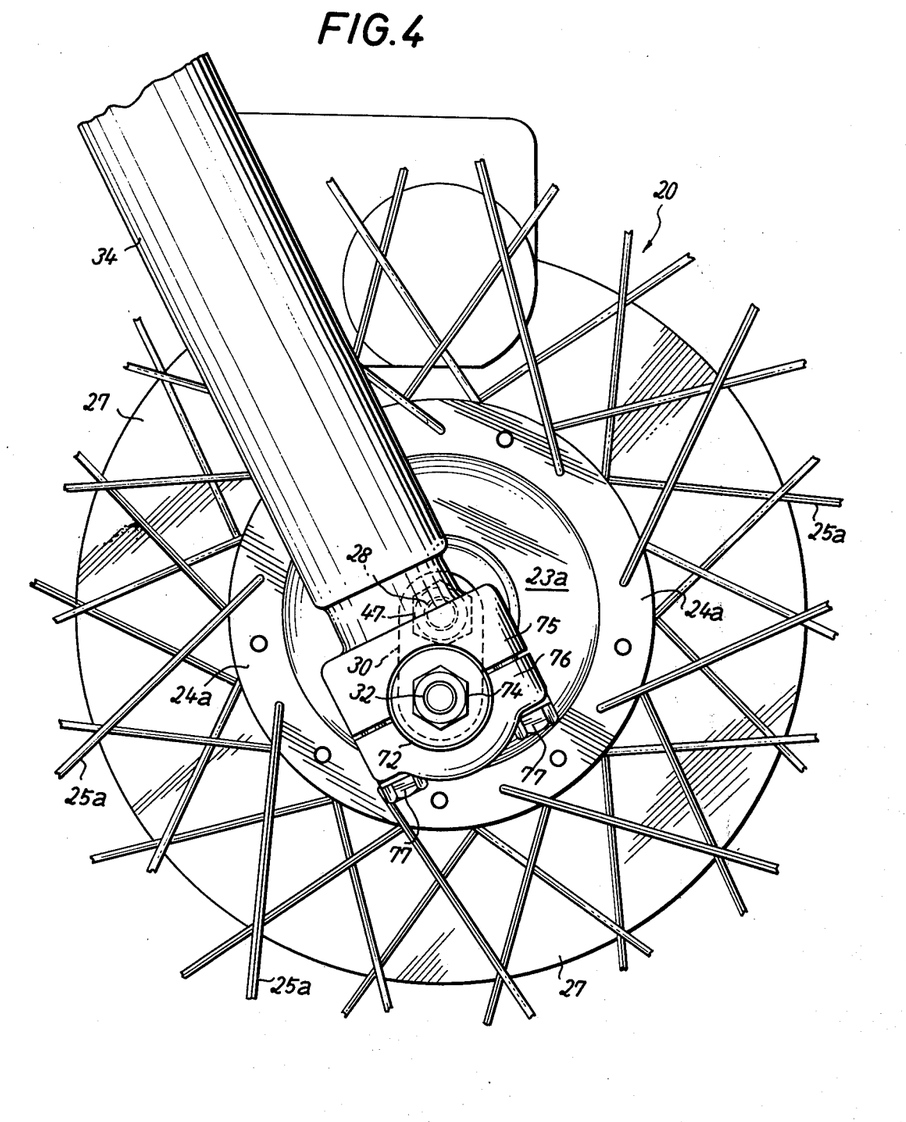
FIG. 4 is a side view of the same.

As is well known, there are two types of front wheels — the drum brake and the disk brake types. As seen in FIGS. 1 and 2, the center of the former is provided with a hub 23 consisting of a brake drum 21 and a brake panel 22 and is fabricated by connecting, by means of spokes 25, ridges 24 formed on both sides of the brake drum 21 around the outer circumference to the rim of the tire side (not given in the figures). On the other hand, as seen in FIGS. 3 and 4, the latter is fabricated by connecting, by means of spokes 25a, ridges 24a formed around the outer circumference on both sides of the hub 23a, to the rim (not given in the figures) of the tire side and by fixing a brake disk 27 with a screw 26 to one side of the said hub 23a. In conventional motorcycles, these front wheels 20 are suspended elastically, by means of a front fork, to the cycle body, where both ends of the axle fitted to the center part of the hub 23 or 23a are inserted directly into the lower part of the front fork 34. In the present invention, however, the front wheel 20 is suspended from the front fork 34 as shown in FIGS. 1 - 4, by means of a crank-shaped eccentric supporter 33, which consists of an axle 28, link members 29, 30 fixed to both its ends and bearing shafts 31, 32 extending from these link members 29, 30 in parallel to the said axle 28 and by fitting said bearing shafts 31, 32 into the lower part of the front fork 34.

Namely, the axle 28 is provided with an extending cap 35 at one end and a threaded section 36 at the other end. The left and right link members 29, 30 are provided at their upper parts with through holes 37, 38 and the large hollows 39, 40 bored concentrically around the outer circumference of the holes in the links respectively fitting onto the said axle 28. The bearing shafts 31, 32 integral with the lower part of the said link members 29, 30, extending outwards in parallel to axle 28 are provided with threaded sections at the ends 41, 42, respectively.

In the assembly of the front wheel suspension unit, the right side link member 29 is inserted from the threaded part 36 side, by means of the through hole 37 in the axle 28, to a position such that the hollow 39 fits onto the cap 35 of the axle 28. Then, in this condition, the axle 28 is inserted into the center part of the hub 23 or 23a of the front wheel 20 using ball bearings 43, 44 or 43a, 44a fitted to the respective hubs in the conventional manner. After that, the left side link member 30 is inserted into the other side of the axle 28 by means of the through hole 38, with a spacer 45 being held between the hub 23 or 23a, and is locked with a nut 47 to the threaded part 36 of the axle 28 using a washer 46.

Figures 5, 6, 7:
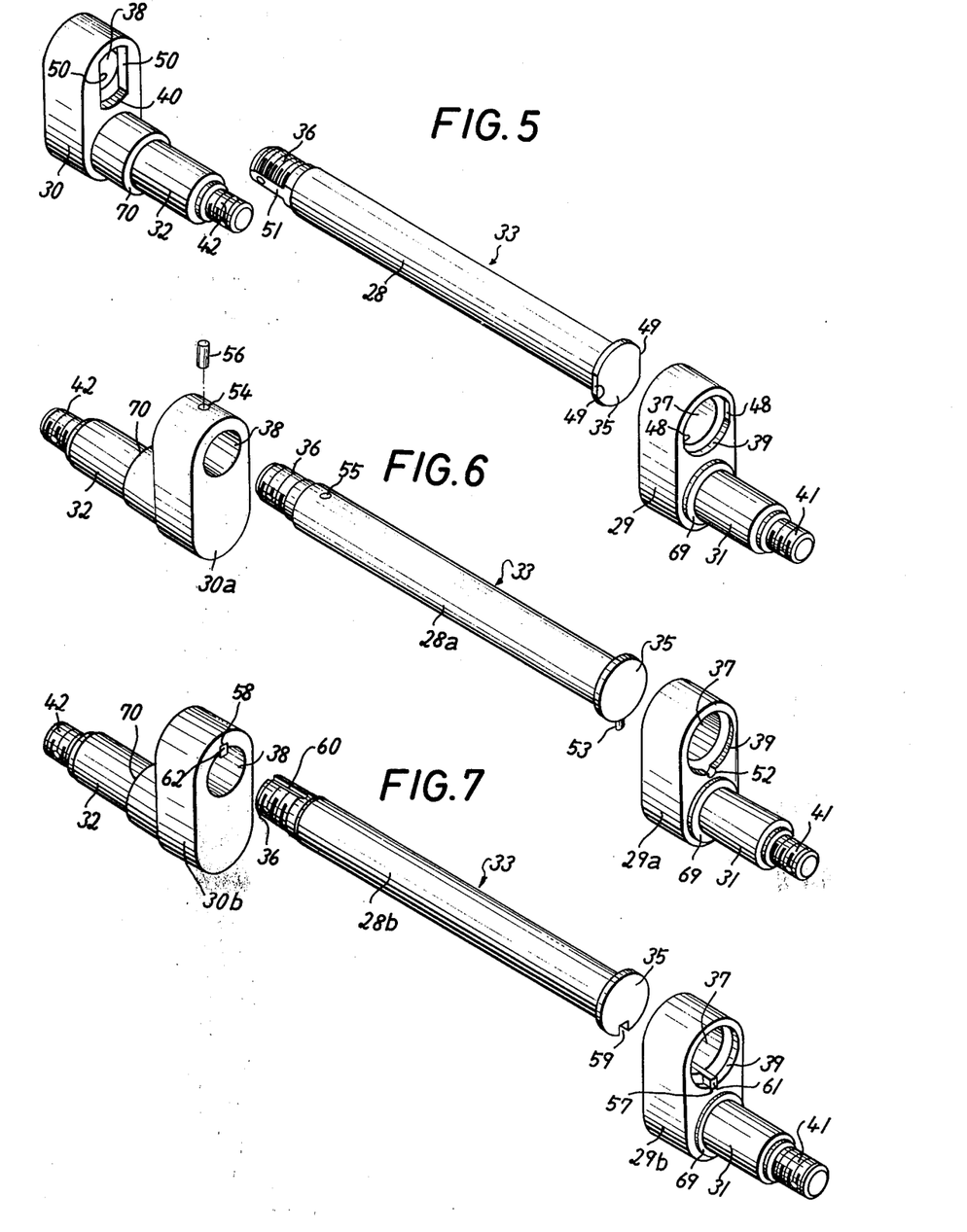
FIGS. 5, 6 and 7 are perspective views showing examples of the angle control mechanisms incorporated in the part connecting the axle and the link members.

In this case, the angles that the left and right link members 29, 30 make with axle 28 must be controlled so as to keep them always equal. For this reason, flat surface sections 48, 49 and 50, 51 are formed in the application example as seen in FIG. 5 so as to fit the hollow 39 of the right side link member 29 with the cap 35 of the axle 28 and so as to fit the hollow 40 of the left side link member 30 with the threaded part 36 of the axle 28, respectively. Thus, the angle that the left and right link members 29, 30 make with the axle 28 may be controlled by means of these flat surface parts 48 - 51. However, the control method is not necessarily limited to the above. For instance, as seen in FIG. 6, the angles that the left and right link members 29a, 30a, or 29b, 30b make with the axle 28a or 28b may be controlled as well by fitting a notch 52 cut through the hollow 39 of the right side link member 29a with a pin 53 attached to the cap 35 of the axle 28a and by driving a pin 56 through the through hole 54 bored in the left side link member 30a into a hole 55 bored in the axle 28a. As seen in FIG. 7, control may also be made by driving keys 61, 62 into key ways 57, 58, 59, 60 cut in the left and right link members 29b, 30b and the axle 28b, respectively. Furthermore, these means may be selected independently for the left and right sides to effect the control.

Next, referring to FIGS. 1 - 4 again, ball bearings 65, 66, 67, 68 are fitted, with holding spacers 63, 64 between, to the bearing shafts 31, 32 which extend outwards from the lower parts of the left and right link members 29, 30 before they are fixed between stepped parts 69, 70 of the bearing shafts 31, 32 and the nuts 73, 74 using washers 71, 72 at the head of the bearing shafts 31, 32, as the nuts 73, 74 are locked onto the threaded sections 41, 42. Then, the said ball bearings 65 - 68 are inserted upwards in the upper half of split-type brackets 75 attached to the lower part of the front fork 34, and holders 76 are attached from the bottom to the brackets 75 and fixed with bolts 77, so that the bearing shafts 31, 32 may be fixed, rotating freely, by means of the ball bearings 65 - 68 to the lower part of the front fork 34.

In this way the front wheel 20 is suspended by the front fork 34 through the medium of the crank-shaped eccentric supporter 33 consisting of the axle 28, left and right link members 29, 30 and the bearing shafts 31, 32 extending from these link members 29, 30. In this case, the front wheel 20 not only may rotate freely around the axis of the axle 28 due to the ball bearings 43, 44 or 43a, 44a, but also may turn around the axis of the bearing shafts 31, 32 due to the ball bearings 65 - 68 incorporated between the bearing shafts 31, 32 and the front fork 34. This makes it possible to suspend the front wheel 20 eccentrically by means of ball bearings of small diameter without using those of large diameter.

Figures 8, 9:
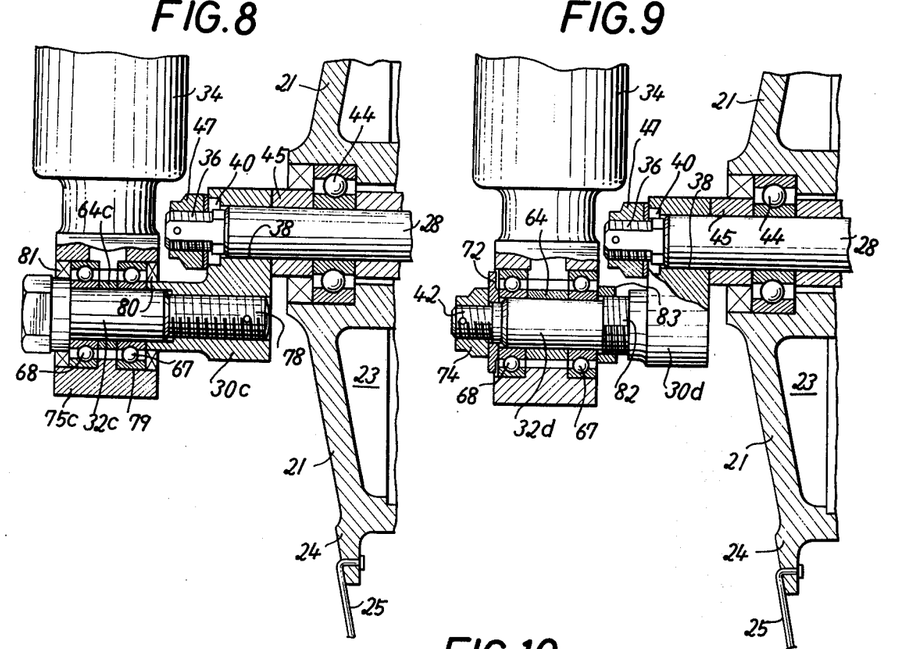
FIG. 8 is a partial front longitudinal sectional view showing an example of the connecting of the link members and the bearing shafts.
FIG. 9 is a front partial longitudinal sectional view showing an application example where a space-adjusting nut is incorporated at the base of the bearing shafts.

In the application examples hitherto described, the left and right bearing shafts 31, 32 are fixed to the lower part of the front fork 34 by means of a split-type bracket 75 attached to the front fork 34 side. Alternatively, however, they may be fixed to the front fork by means of a non-split type bracket if the following measure is taken. Namely, as seen in FIG. 8, the link member 30c and the bearing shaft 32c are made separately and connected by a screw 78. In assembly, ball bearings 67, 68 are fitted, with a holding spacer 64c between, in a bearing hole 79 of the bracket part 75c of the front fork 34 and are fitted with dust seals 80, 81 from both sides. Then, the bearing shaft 32c is inserted from the outside through the seals and is fixed, by the use of a screw, to the lower part of the link member 30c. In this case, since the bracket part 75c of the front fork 34 has no connecting clearance and since the bearing hole 79 is completely closed by means of dust seals 80, 81 at both ends, the ball bearings 67, 68 may be well protected from contamination due to dust, etc. It should be added that, although only the left side link member was shown in the said application example of FIG. 8, both the bearing shafts may be suspended from the front fork by using non-split type brackets if the right side link member is also formed in the same manner.

Figure 10:
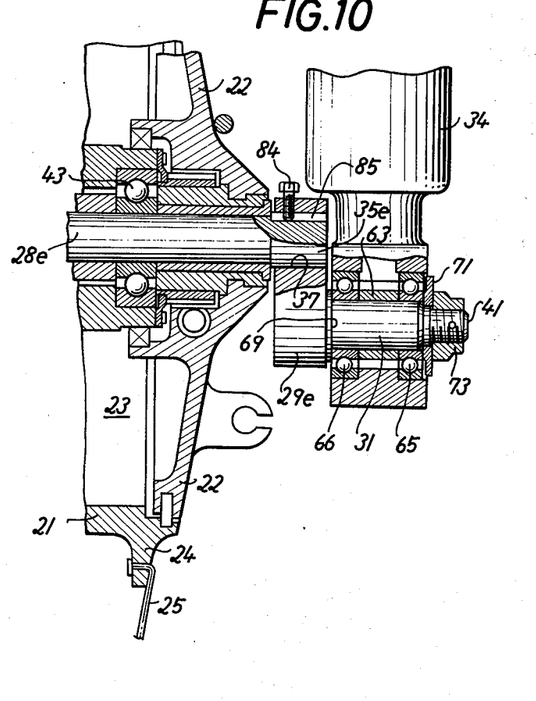
FIG. 10 is a partial front longitudinal sectional view showing an example of connecting the axle and the link members which provides both spacing and angle adjusting functions.

In the assembly of the front wheel suspension units described hitherto, if the distance between the left and right link members is not correct in relation to the distance between the left and right bracket parts of the front fork because of some error in the fabrication, the front fork will undergo a bending stress, inwards or outwards, as the bearing shafts are fixed to the bracket parts and this will hinder the front fork, a telescopic member, from extending and contracting smoothly. In order to prevent this, therefore, the base of the bearing shaft 32d of the left side link member 30d has a threaded section 82, an example of which is seen in the application example of FIG. 9, and an adjusting nut 83 is coupled to the threaded section 82. Thus, a dimensional error between the said both distances may be resolved by turning the nut. Alternatively, as seen in the application example of FIG. 10, a tap bolt 84 is screwed into the right side link member 29e until the tip of the bolt 84 fits into groove 85 cut at the head 35e of the axle 28e, thus making the link member 29e movable along the head 35e in the axial direction while determining the angle link member 29e makes with the axle 28e by means of the tap bolt 84 and the groove 85. After assembly, therefore, a dimensional deviation due to fabrication errors may be resolved by clamping the said tap bolt 84 so as to lock the link member 29e to the head 35e of the axle 28e.

Figure 11:
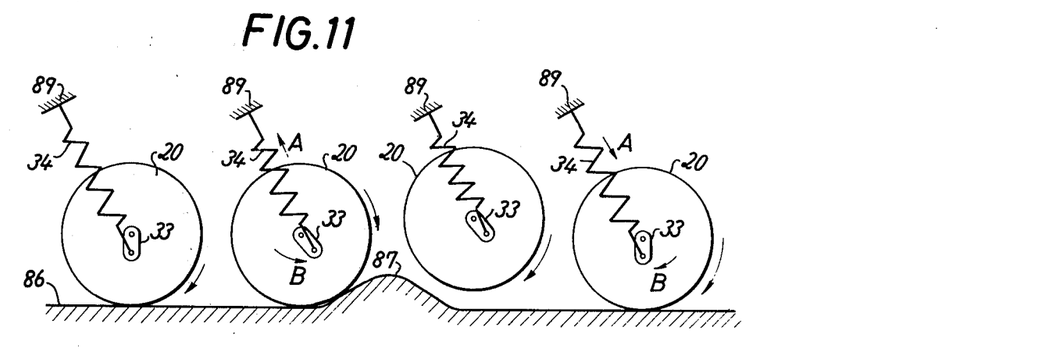
FIG. 11 is a diagram showing the operational condition of a front wheel suspension unit made according to the present invention when the wheel runs over a projection of the road surface.
Figure 12:
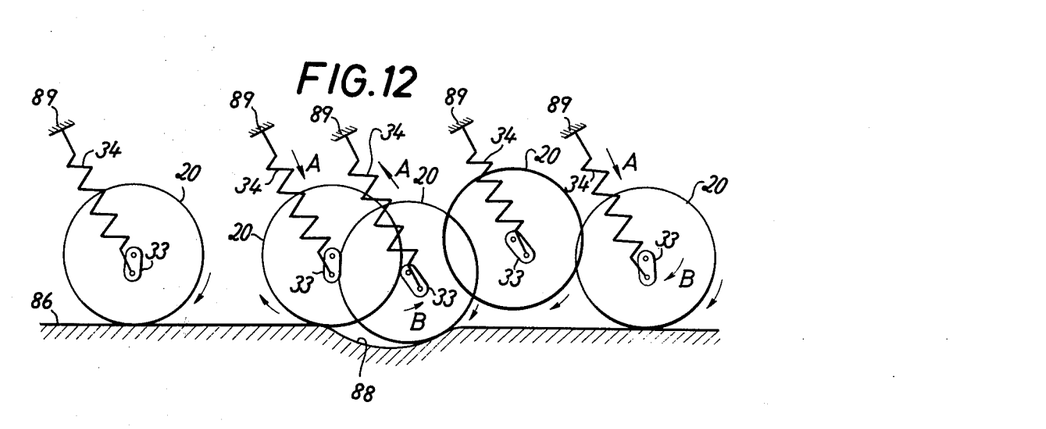
FIG. 12 is a diagram showing the operational condition of the same front wheel suspension unit made according to the present invention when the wheel runs over a hollow in the road surface.
Figure 13:
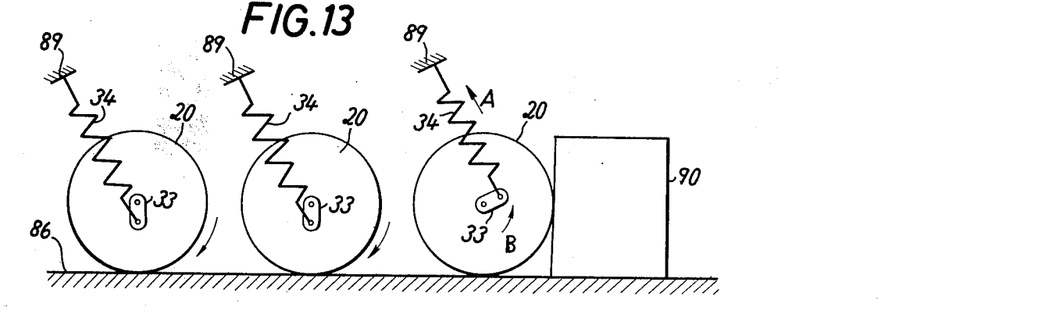
FIG. 13 is a diagram showing the operational condition of the same when the wheel collides with an obstacle on the road surface.

In normally driving, therefore, the front wheel suspension unit of the present invention effects smooth driving of the cycle body while allowing the front wheel 20 to revolve around the axis of the axle incorporated in the eccentric supporter 33. Furthermore, when the front wheel 20 runs into a projection 87 of the rod surface 86 as seen in FIG. 11, or when it drops into a hollow 88 in the road surface 86 as seen in FIG. 12, the eccentric supporter 33 will execute a circular motion as is indicated by arrow mark B and thus the front wheel 20 will move backwards against the cycle body 89 and then it returns to the normal position after passing the projection or the hollow. At the same time as the circular motion of the eccentric supporter 33 takes place, the front fork 34 makes an extending or contracting motion as is indicated by arrow mark A, the impact force thus being absorbed and lessened. In addition, when the front wheel 20 collides with an obstacle 90 on the road surface 86, as seen in FIG. 13 the eccentric supporter 33 executes a circular motion in the direction indicated by arrow mark B in the same manner. Thus, the front wheel 20 moves backwards. At the same time, since the impact input in the horizontal direction of movement is converted to an upward force and transmitted to the front fork 34, the front fork 34 may contract in the direction of arrow mark A to absorb and lessen the impact force produced by the collision. In these cases, the lessening of the impact force equals the product ($m \times \alpha$) of the mass $m$ of the cycle body 89 and the relative acceleration $\alpha$ of the cycle body 89 with respect to the front wheel 20.

Since the front wheel suspension unit of the present invention may produce adequate buffer effects against impact inputs in the horizontal direction of movement as well as in the vertical direction, driving may be done more comfortably. Not only can the road holding performance be improved, but also course deviations on uneven roads may be prevented.

What is claimed is:

1. A motorcycle front wheel suspension unit, comprising
   a telescopic front fork having a lower end portion;
   a front wheel provided with a center hub having opposite axial ends;
   an axle freely rotatably journalled in said hub and having end portions which extend outwardly past said axle ends;
   a pair of elongated link members extending transversely of said axle and each having a first section mounted on one of said end portions and a longitudinally spaced second section; and
   a pair of mounting shafts extending parallel to said axle and each having one part mounted in one of said second sections and another part freely turnably journalled in said lower end portion of said front fork, said other parts being axially aligned with one another and defining a pivot axis, said wheel being free to normally rotate relative to said front fork about said axle, but when subjected to a substantially horizontally acting force being free to yield to the same by pivoting with said axle relative to said front fork about said pivot axis.

2. A motorcycle front wheel suspension unit, comprising
   a front wheel having a hub located in its center part;
   an axle freely rotatably extending through the center of said hub;
   link members fixed to both ends of said axle;
   bearing shafts extending outwards from respective lower parts of said link members parallel to said axle;
   an angle control device mounting said link members with said bearing shafts thereon symmetrically to said ends of said axle; and
   a telescopic front fork having a lower part wherein said bearing shafts are freely rotatably supported.

3. A unit as stated in claim 2, wherein said link members and said bearing shafts are separate elements; and further comprising screws connecting each of said link members with one of said bearing shafts.

4. A unit as stated in claim 3, wherein at least one of the bearing shafts has a base provided with an adjusting nut for controlling spacing.

5. A unit as stated in claim 3, wherein at least one of the link members is inserted on the axle so that the link member is movable in the axial direction, and is provided with a tap bolt, so that it may be fixed at a stipulated position and angle.

* * * * *